(12) United States Patent
Brown

(10) Patent No.: US 10,808,746 B2
(45) Date of Patent: Oct. 20, 2020

(54) LOAD INDICATING FASTENER

(71) Applicant: Integrity Engineering Solutions Pty Ltd, Dunsborough (AU)

(72) Inventor: Ian Warren Brown, Dunsborough (AU)

(73) Assignee: Integrity Engineering Solutions Pty Ltd, Dunsborough (AU)

( * ) Notice: Subject to any disclaimer, the term of this patent is extended or adjusted under 35 U.S.C. 154(b) by 213 days.

(21) Appl. No.: 16/195,485

(22) Filed: Nov. 19, 2018

(65) Prior Publication Data

US 2019/0107138 A1    Apr. 11, 2019

Related U.S. Application Data

(63) Continuation of application No. PCT/AU2017/050461, filed on May 18, 2017.

(30) Foreign Application Priority Data

May 18, 2016    (AU) ................................ 2016901865

(51) Int. Cl.
| | | |
|---|---|---|
| *F16B 31/02* | (2006.01) | |
| *G01L 5/24* | (2006.01) | |
| *G01L 1/04* | (2006.01) | |

(52) U.S. Cl.
CPC .............. *F16B 31/025* (2013.01); *G01L 1/04* (2013.01); *G01L 5/24* (2013.01)

(58) Field of Classification Search
CPC ............. G01L 1/04; G01L 5/24; F16B 31/025
See application file for complete search history.

(56) References Cited

U.S. PATENT DOCUMENTS 3,561,260 A * 2/1971 Reynolds .................. G01L 5/24
                                                                    73/761
3,799,108 A * 3/1974 Mosow ..................... G01L 5/24
                                                                    411/13

(Continued)

FOREIGN PATENT DOCUMENTS

| WO | WO 1999/009327 | 2/1999 |
| WO | WO 2010/140002 | 12/2010 |

(Continued)

*Primary Examiner* — David J Bolduc
(74) *Attorney, Agent, or Firm* — Levine Bagade Han LLP

(57) ABSTRACT

A bolt load measuring arrangement 31 has a bolt 4 with a reference pin 10 extending from the root 12 of a hole 11 in the bolt. Shoulder 23 of a bore 22 defines a strainable portion datum shoulder located within the strainable portion 7 of the bolt 4. Strain datum sleeve 32 can have a strain datum surface 16 at its outer end. The strain datum sleeve 32 has a hole 33 to allow it to pass around the reference pin 10 which extends to the end of the strain datum sleeve. The reference datum 15 is on the outer end of the reference pin 10 and the strain datum 16 is on the outer end of the strain datum sleeve 32. The outer end of the strain datum sleeve includes an alignment protrusion 34 over which the measuring tool 40 engages. Fit between the alignment protrusion and the tool 40 is essential to achieving the alignment accuracy for accurate datum relative position measurements and therefore accurate load measurement. For the alignment of the measuring tool 40 to be sufficiently accurate, the engagement length 37 is at least 0.9 times the engagement width 38, being 0.9 times the width or diameter of the alignment protrusion.

20 Claims, 7 Drawing Sheets

(56) References Cited

U.S. PATENT DOCUMENTS

| | | | | |
|---|---|---|---|---|
| 3,943,819 A | | 3/1976 | Charron | |
| 3,964,299 A | * | 6/1976 | Johnson | F16B 31/025 116/272 |
| 4,041,776 A | * | 8/1977 | Payne | F16B 31/025 73/800 |
| D248,824 S | * | 8/1978 | Imai | D8/387 |
| 4,114,428 A | * | 9/1978 | Popenoe | G01B 7/22 331/65 |
| 4,402,222 A | * | 9/1983 | Olson | G01L 1/255 73/579 |
| 4,676,109 A | | 6/1987 | Wallace | |
| 4,686,859 A | * | 8/1987 | Wallace | B25B 23/14 411/14 |
| 5,102,273 A | * | 4/1992 | Stanage | F16B 31/025 411/14 |
| 5,672,178 A | * | 9/1997 | Petersen | A61B 17/68 606/75 |
| 5,697,746 A | * | 12/1997 | Brown | F16B 23/0092 411/383 |
| 6,204,771 B1 | * | 3/2001 | Ceney | F16B 31/025 250/559.19 |
| 6,746,186 B2 | * | 6/2004 | Ukai | B23B 51/02 408/226 |
| D585,731 S | * | 2/2009 | Carrillo, Sr. | D8/387 |
| 7,713,013 B2 | * | 5/2010 | Sedgwick | F16B 23/0092 411/411 |
| 7,883,307 B2 | * | 2/2011 | Pippard | F16B 25/0031 411/387.1 |
| D639,645 S | * | 6/2011 | Carrillo, Sr. | D8/387 |
| 8,024,979 B2 | * | 9/2011 | Clarke | F16B 31/025 73/761 |
| 2008/0047353 A1 | * | 2/2008 | Clark | F16B 31/025 73/761 |
| 2009/0148254 A1 | * | 6/2009 | Carrillo, Sr. | F16B 35/06 411/404 |
| 2009/0210173 A1 | * | 8/2009 | Arms | G01L 5/161 702/42 |
| 2010/0162829 A1 | * | 7/2010 | Chiapuzzi | G01L 5/24 73/862.21 |
| 2010/0239386 A1 | * | 9/2010 | Sedgwick | A47G 1/20 411/402 |
| 2010/0284759 A1 | * | 11/2010 | Clarke | B23P 11/00 411/9 |
| 2011/0056166 A1 | * | 3/2011 | Bartlett | F16B 35/06 52/742.14 |
| 2017/0218999 A1 | * | 8/2017 | Brown | C21D 1/26 |
| 2018/0073542 A1 | * | 3/2018 | Saigo | G01L 1/2287 |
| 2018/0274579 A1 | * | 9/2018 | Chu | G01L 5/24 |

FOREIGN PATENT DOCUMENTS

| | | |
|---|---|---|
| WO | WO 2016/015092 | 2/2016 |
| WO | WO 2017/197457 | 11/2017 |

* cited by examiner

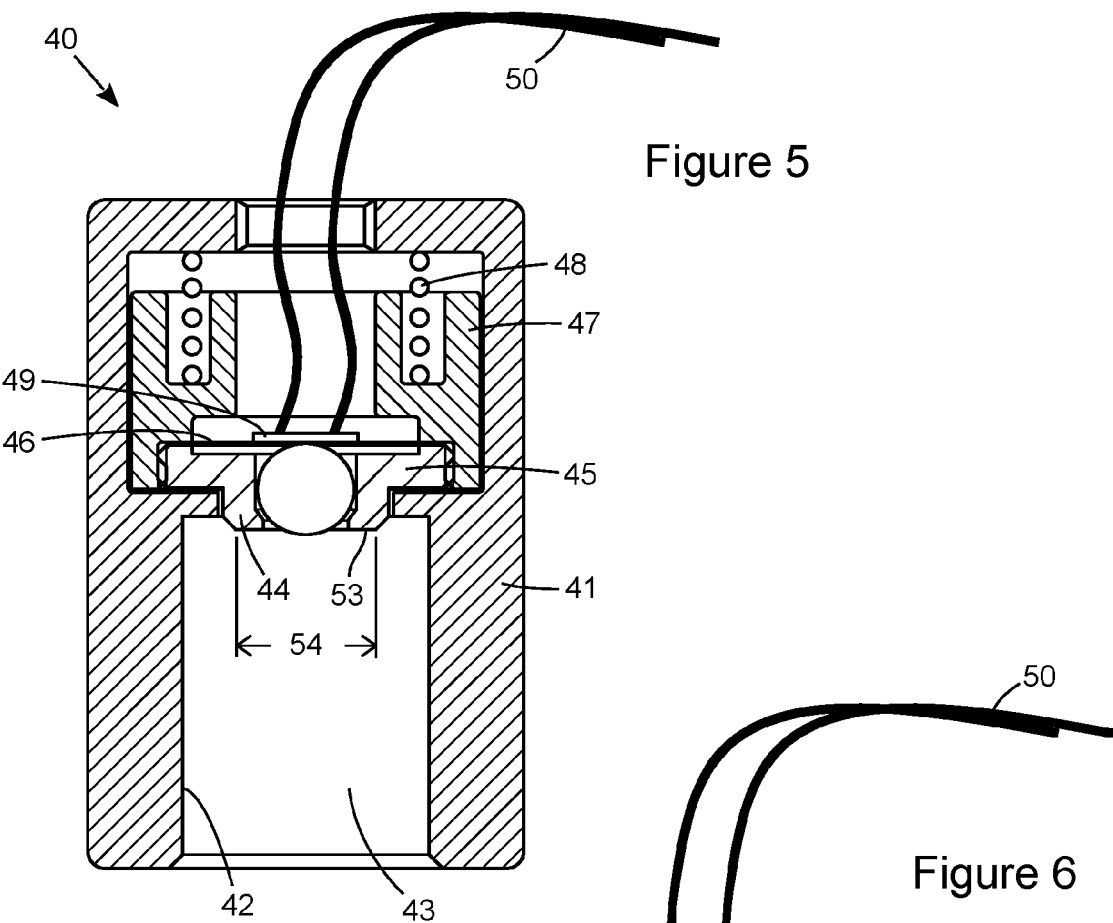
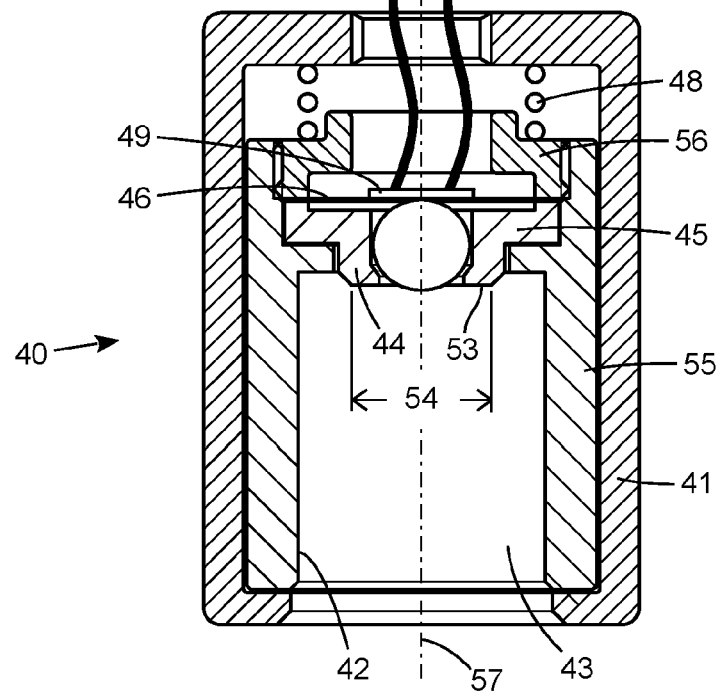

LOAD INDICATING FASTENER

CROSS-REFERENCE TO RELATED APPLICATIONS

This application is a continuation of International Application No. PCT/AU2017/050461, filed May 18, 2017, which claims priority to Australian Application No. 2016901865, filed May 18, 2016, both of which are incorporated by reference in their entireties.

FIELD OF THE INVENTION

The present invention relates to fasteners and specifically relates to load indicating fasteners and tools for measuring the indicated load.

BACKGROUND TO THE INVENTION

In some applications it is important to know the load on a bolt, e.g. in applications such as pressure boundary bolted joints including piping and pressure vessel gasketed, flanged, bolted joints. "Bolt" as used herein takes in bolts with heads, and bolts without heads. Bolts without heads are known as "stud bolts". Measuring and monitoring the load in individual bolts is beneficial to the safe operation of the bolted joint and both contact and non-contact bolt load measuring methods are known.

FIG. 1 shows a contact type bolt load measuring arrangement 1 similar to that disclosed in international patent publication number WO2010/140002, with nuts 2 and 3 able to provide a clamping force therebetween by being tightened on stud bolt 4. Therefore the region of the bolt within the first nut 2 is a first load receiving portion 5 and the region of the bolt within the second nut 3 is a second load receiving portion 6. The nuts apply a tension load to the bolt 4 corresponding to the clamping force between the two nuts 2, 3, causing the bolt 4 to strain (or more specifically to extend). "Strain" as used herein refers to a change in a dimension expressed as a proportion of that dimension (e.g. $\delta L/L$ where L is the magnitude of the dimension and $\delta$ represents a change of the magnitude of the dimension). Within the elastic range of the material, strain is directly relatable to load via the elastic properties of the material. The region of the bolt between the two portions 5 and 6 can be referred to as a strainable portion 7. In WO2010/140002 a hole is bored axially in the bolt, the hole having a threaded base into which a pin is screwed. This method of manufacture is used for simplicity, but adds a joint that can move, negating the accuracy of any measurements then taken. In FIG. 1 the reference pin 10 in hole 11 is shown integral with the bolt 4. This can be formed by eroding an annular gap to form the pin 10, or more easily, the hole 11 can be bored then the reference pin 10 welded at the root 12. The root 12 of the reference pin 10 is well into the strainable portion 7 of the bolt 4, since the axial length between the root 12 and the first load receiving portion 5 determines the magnitude of relative motion between the reference datum 15 on the outer end of the reference pin 10 and the strain datum surface 16 on the end of the bolt 4 due to axial load change on the strainable portion 7 of the bolt. Since the axial distance between the strain datum and the reference datum varies in dependence on the tensile load on the bolt, measuring the relative motion between the reference datum 15 and the strain datum 16 permits the load on the bolt to be calculated.

A dial gauge or similar 18 is used to contact the reference datum 15 and the strain datum 16 to detect the axial difference therebetween. However the dial gauge 18 can easily be misaligned with the primary axis 17 of the reference pin 10, by for example the angular misalignment shown in FIG. 1. Such misalignment causes errors in the measurement of the axial distance between the strain datum surface 16 and the reference datum 15 and when measuring load by strain deflection, such errors can easily make the measurement results worthless.

FIG. 2 shows a contact type bolt load measuring arrangement 21 as disclosed in the Applicant's international patent publication number WO2016/015092. This employs a number of features to ensure that the measurement accurately reflects the load in the bolt. The root 12 of the reference pin 10 is integral with the bolt 4 to avoid possible motion therebetween in use and both the root 12 and the reference datum 15 of the reference pin are within the strainable portion 7 of the bolt as is the strain datum 16, which is now a shoulder 23 at the end of the annular hole 11 and the base of bore 22. This helps to remove any errors due to the position of the nut 2 relative to the bolt 4, which may vary as the load is adjusted by tightening the bolt and allows the reference and strain datum surfaces to be machined to be substantially co-planar when the bolt is at zero (or another known) load. Such variation in the position of the nut 2 in an arrangement as shown in FIG. 1 effectively varies the length of the bolt over which measured strain is occurring since the strain datum in FIG. 1 is not within the strainable portion length.

Also in FIG. 2 the use of a probe 24 on the measurement tool 25 that accurately aligns with the bore 22 in the end of the bolt contributes to the accuracy of measurement. The bore 22 can reduce concentricity type misalignment between the measurement tool and the datum surfaces on the bolt. The use of a bore 22 of sufficient length and tight fit tolerance with the probe 24 also ensures that the error in any measurement between the reference datum 15 and the strain datum 16 due to angular misalignment (for example of the type shown in FIG. 1) can be minimised. This prior document by the applicant also provides the option of indexing the rotational position of the measurement tool relative to the bolt to ensure that errors due to inconsistencies in the datum surfaces are negated, example of such inconsistencies being errors in the perpendicularity of the datum surfaces relative to the primary axis of the reference pin, bolt or measuring tool probe, or poor surface finish of the datum surfaces so that the probe picks up on different high points on the surfaces depending on rotational orientation of the tool relative to the bolt. While the arrangement shown in FIG. 2 provides a very high degree of accuracy and repeatability for the bolt load measurement, the machining of the bolts is not trivial or cheap and the length of probe required to reach the datum surfaces inside the strainable portion requires a significant minimum clearance between the end of the bolt and any surrounding structures or components. Also the size of the probe is difficult to accommodate in smaller bolts, limiting the minimum size of bolt to which the invention can be applied.

It would therefore be desirable to provide a bolt and/or a tool for measuring the load in the bolt that overcomes at least one disadvantage of the known arrangements.

SUMMARY OF THE INVENTION

According to a first aspect of the invention there is provided a fastener including: a first load receiving portion and a second load receiving portion; a strainable portion between the first and second load receiving portions; a measuring end including an alignment protrusion, having a strain datum at an outer end; a cavity extending from the measuring end of the fastener, the cavity including a reference pin root shoulder located within the stainable portion of the fastener; a reference pin having a root end and a reference end, the root end of the reference pin being fixed to the reference pin root shoulder in the cavity and the reference end of the reference pin including or defining a reference datum, wherein the alignment protrusion has an engagement portion having an engagement width perpendicular to an engagement portion axial length, the engagement portion axial length being at least 0.9 times the engagement width or at least equal to the square root of a cross-sectional area for non-circular outer profiles.

Therefore the axial distance between the strain datum and the reference datum varies in dependence on the load on the fastener, i.e. a tensile load to which the strainable portion is subject.

It will be appreciated that the cavity extending from the measuring end of the fastener can be from the strain datum, through the alignment protrusion and into the strainable portion.

Providing an external alignment surface, such as for example the circumferential surface of a cylindrical alignment protrusion, and external reference datum and strain datum surfaces, provides the benefits of being less expensive to machine than internal alignment, reference datum and strain datum surfaces, and being able to be machined on bolts of smaller size. The use of a minimum length of alignment surface, i.e. a minimum length of engagement portion of the external alignment protrusion, still maintains many of the accuracy benefits of an internal alignment bore.

The alignment protrusion may be integral with the measuring end of the fastener.

The cavity may further include a strainable portion datum shoulder located within the strainable portion of the fastener, the fastener further including: a strain datum sleeve having a strainable portion datum shoulder contacting end and a strain datum end, the strain datum end including the alignment protrusion and the strain datum—e.g. the alignment protrusion is integral with the sleeve, the opposite end of the sleeve being fixed to the remainder of the fastener.

One or more forms of the present invention may provide a fastener including: a first load receiving portion and a second load receiving portion; a strainable portion between the first and second load receiving portions; a measuring end including an alignment protrusion; a cavity extending from the measuring end of the fastener, the cavity including a reference pin root shoulder and a strainable portion datum shoulder, the reference pin root shoulder and the strainable portion datum shoulder being located within the strainable portion of the fastener; a reference pin having a root end and a reference end, the root end of the reference pin being fixed to the reference pin root shoulder in the cavity and the reference end of the reference pin including or defining a reference datum, and a strain datum sleeve having a strainable portion datum shoulder contacting end and a strain datum end, the strain datum end including or defining a strain datum, wherein the alignment protrusion has an engagement portion having an engagement width perpendicular to an engagement portion axial length, the engagement portion axial length being at least 0.9 times the engagement width or at least equal to the square root of a cross-sectional area for non-circular outer profiles.

It will be appreciated that the cavity extending from the measuring end of the fastener can be through the alignment protrusion and into the strainable portion.

In either form of the fastener, the alignment protrusion may include an outer or circumferential or peripheral engagement surface to engage a measuring tool. For example the protrusion can be cylindrical, in which case the engagement width would be a diameter of the cylindrical protrusion.

The reference pin may include a first portion between the root end of the reference pin and a boundary between the strainable portion and the load receiving portion towards the measuring end of the fastener, the reference pin including a second portion between the first portion and the reference end of the reference pin. When the fastener is not loaded, an axial distance from the highest point of the reference datum to the highest point of the strain datum may be less than $\frac{1}{1000}$th of an axial length of the first portion of the reference pin, or preferably less than $\frac{1}{2000}$th or for increased accuracy preferably less than $\frac{1}{4000}$th of the axial length of the first portion of the reference pin.

Any form of the fastener of the present invention may have the alignment protrusion configured to engage a measuring tool at at least two locations spaced apart by an axial spacing length that is at least equal to the square root of a transverse cross-sectional area enclosed by an outer profile at said at least two locations.

The engagement portion axial length of the alignment protrusion may be at least 1.5 times the engagement width. The alignment protrusion may be configured to engage a measuring tool at at least two locations spaced apart by an axial spacing length that is at least 1.5 times the square root of a cross-sectional area enclosed by an outer profile at said at least two locations. Alternatively the engagement portion axial length of the alignment protrusion may be at least 2 times the engagement width. The alignment protrusion may be configured to engage a measuring tool at at least two locations spaced apart by an axial spacing length that is at least 2 times the square root of a transverse cross-sectional area enclosed by an outer profile at said at least two locations.

The engagement width of the alignment protrusion may have a tolerance of no wider than ISO loose running fit tolerance c11. Alternatively, the engagement width of the alignment protrusion may have a tighter tolerance of no wider than ISO free running fit tolerance d9, or no wider than ISO close running fit tolerance f7 or no wider than ISO sliding fit tolerance g6 or no wider than ISO locational clearance fit tolerance h6. ISO used herein refers to the commonly recognised International Organisation for Standardisation (ISO) and the associated standards set by the ISO.

The fastener may include a retaining portion for retaining a tool or protective cap on the alignment protrusion.

One or more forms of the present invention may provide a system including any of the above fasteners and a measuring tool, the measuring tool including an alignment cavity for receiving the alignment protrusion. A fit between the alignment cavity and the alignment protrusion may be at loosest a running fit. For example, the fit may be at loosest substantially an American National Standards Institute (ANSI) RC6 running fit, or preferably at loosest substantially a sliding fit or for increased measurement accuracy and reliability the fit may be at loosest a close sliding fit.

The alignment cavity may be engaged around the alignment protrusion, preferably for the engagement portion axial engagement length, the tool being configured to produce a signal or read-out value, the fit between the alignment cavity and the alignment protrusion ensuring that the tool is substantially aligned with the fastener to reduce or substantially eliminate variations in the signal or read out value associated for example with rotating the tool about an axis perpendicular to a primary axis of the fastener.

The fastener and the tool may include features co-operable to limit rotation of the tool relative to the fastener. For example, the fastener and the tool may include features to ensure a substantially consistent rotational location of the tool relative to the fastener, so that, when the tool is configured to produce a signal or read-out value, variations in the signal or read out value (associated for example with rotating the tool about a primary axis of the fastener) are reduced or substantially eliminated.

A two point tolerance range on the engagement width of the alignment protrusion engaging portion of the fastener and on a width of the alignment cavity of the tool may each have an envelope requirement specifier to ensure angularity, linearity and concentricity variations do not exceed an envelope defined by a two point tolerance range corresponding to the fit between the alignment cavity and the alignment protrusion.

One or more forms of the present invention may provide a method of checking the load on the fastener, the measuring tool may be configured to produce a signal or read-out corresponding to said load. The method may include engaging the tool onto the fastener such that the alignment cavity is engaged over the alignment protrusion by an engagement length, the fit and the engagement length together ensuring that the tool and the alignment protrusion are substantially aligned to reduce or substantially eliminate variations in the signal or readout value associated with rotating the tool.

One or more forms of the present invention may provide a tool for checking the load on the fastener, the tool including: an alignment cavity to engage the alignment protrusion to align the tool; a strain datum contacting portion for contacting the strain datum and a reference datum contacting portion for contacting the reference datum.

The alignment cavity of the tool may have a bore tolerance of no wider than ISO tolerance H9 to align the tool. Alternatively, the alignment cavity may have a bore tolerance of no wider than ISO tolerance H8 or no wider than ISO tolerance H7 or no wider than ISO tolerance H6 to align the tool.

The tool may further include: a deformable portion and a strain gauge; the strain datum contacting portion and the reference datum contacting portion respectively extending away from the deformable portion and being moveable relative to each other to simultaneously engage the respective strain datum or reference datum; the deformable portion being arranged to be deformed by the relative movement; and the strain gauge being arranged to provide an indication of the deformation. The deformable portion may be a diaphragm.

The alignment cavity of the tool may have an engagement width and an engagement length, the engagement length of the alignment cavity being at least 0.9 times the engagement width or at least equal to the square root of a cross-sectional area of the alignment cavity for non-circular outer profiles. Alternatively, the engagement length of the alignment cavity may be at least 1.8 times the engagement width or at least equal to two times the square root of a cross-sectional area of the alignment cavity for non-circular outer profiles.

The tool may further include a retaining portion for retaining the tool on the fastener. Alternatively or additionally, the tool may further include a bias for biasing, relative to the retaining portion, one of the datum contacting portions.

It will be convenient to further describe the invention by reference to the accompanying drawings which illustrate preferred aspects of the invention. Other embodiments of the invention are possible and consequently particularity of the accompanying drawings is not to be understood as superseding the generality of the preceding description of the invention.

BRIEF DESCRIPTION OF THE DRAWINGS

In the drawings:

FIG. 5 is a cross-sectional view of the measuring tool of FIG. 3.

FIG. 6 is a cross-sectional view of a measuring tool according to an alternative embodiment of the present invention.

DESCRIPTION OF PREFERRED EMBODIMENT

Figures 3, 4:
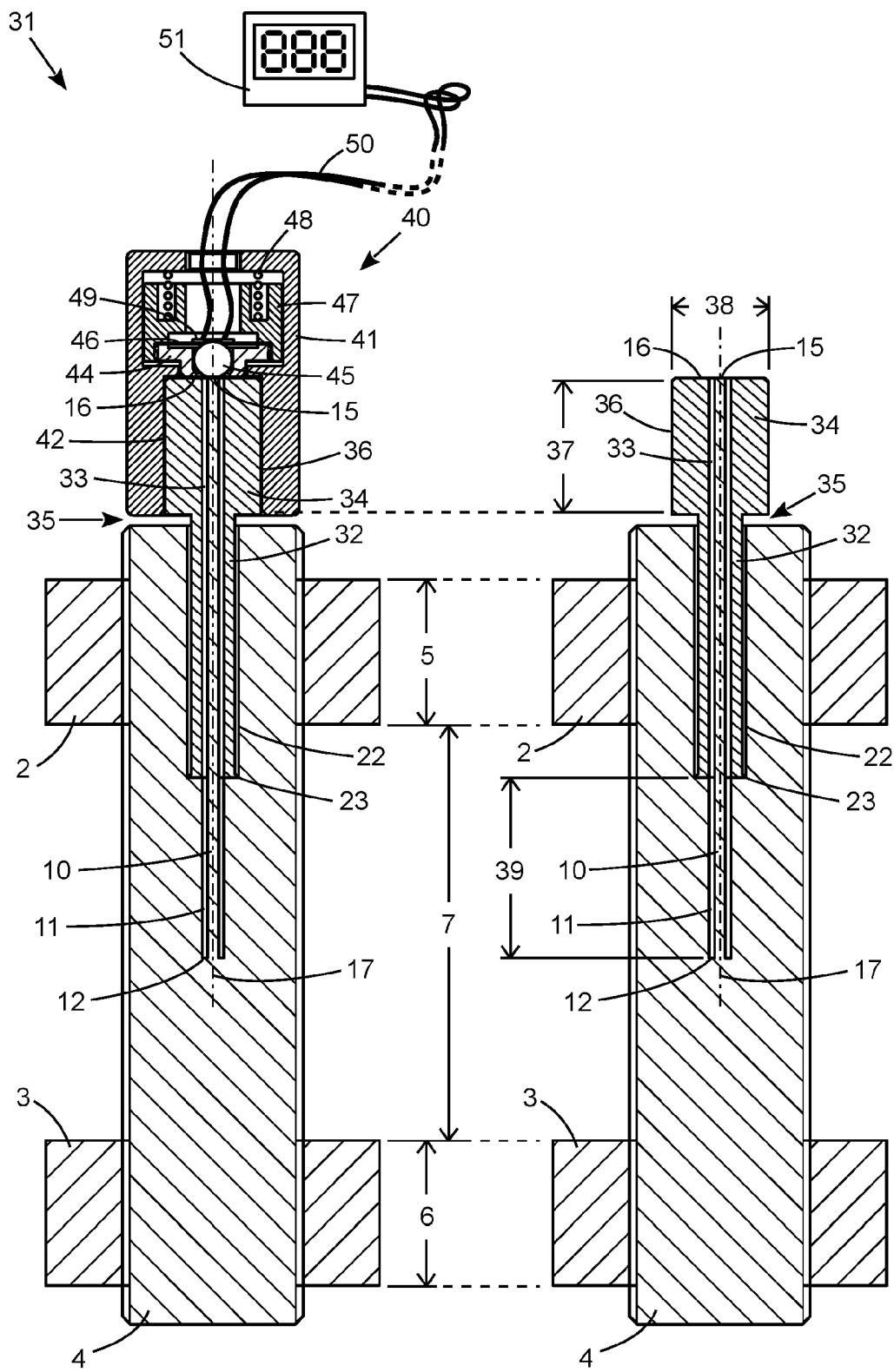
FIG. 3 is a cross-sectional view of a bolt and measuring tool according to an embodiment of the present invention.
FIG. 4 is a cross-sectional view of the bolt of FIG. 3.

FIG. 3 shows a bolt load measuring arrangement 31 including a bolt 4 with nuts 2 and 3 defining first and second load receiving portions 5 and 6 of the bolt, between which is the strainable portion 7. The bolt load measuring arrangement 31 also includes a measuring tool 40 connected by signal wires 50 to a load monitoring system and/or force display device 51. FIG. 4 shows just the bolt from FIG. 3 with the measuring tool omitted for clarity and FIG. 5 shows the measuring tool from FIG. 3 with the bolt omitted for clarity. In FIGS. 3 and 4, the reference pin 10 is fixed to or integral with the root of hole 11, the pin being formed for example by spark erosion of the annular hole 11 or by drilling the hole 11 and welding the reference pin 10 to the root 12 of the hole. Shoulder 23 of the bore 22 defines a strainable portion datum shoulder located within the strainable portion 7 of the bolt 4. Strain datum sleeve 32 is fixed to the strainable portion datum shoulder 23, preferably by welding, and has a strain datum surface 16 at the outer end. The strain datum sleeve 32 has a hole 33 to allow it to pass around the reference pin 10 which in turn extends to the end of the strain datum sleeve. The reference datum 15 is on the outer end of the reference pin 10 and the strain datum 16 is on the outer end of the strain datum sleeve 32.

The outer end of the strain datum sleeve also includes an alignment protrusion 34, over which the measuring tool 40 is engaged in FIG. 3. A gap 35 is left between the end of the main body of the bolt 4 and the alignment protrusion 34 to ensure that the alignment protrusion never interferes with the main body of the bolt 4 under normal operation of the bolt (e.g. within the strain or load rating of the bolt). The alignment protrusion is preferably cylindrical for efficient and accurate machining of the width 38 (e.g. the outer diameter surface 36 for a cylindrical alignment protrusion) of the protrusion 34, since the fit between the protrusion 34 and the tool 40 is essential to achieving the alignment accuracy for accurate datum relative position measurements and therefore accurate load measurement. The length between the ends of the engagement surface 36 is the maximum possible engagement length 37 between the measuring tool 40 and the alignment protrusion 34. The engagement width is substantially perpendicular to the primary axis 17 of the reference pin 10 or bolt 4 and the engagement length is axial, i.e. substantially aligned with the primary axis 17 of the reference pin 10 or bolt 4. Essentially, the engagement contact is at points at either end of the engagement length 37 and the centre portion of the alignment protrusion can therefore be waisted or otherwise absent. For the alignment of the measuring tool 40 to be sufficiently accurate, the engagement length 37 needs to be at least 0.9 times the engagement width 38 (i.e. 0.9 times the width or diameter of the alignment protrusion), which is approximately equivalent to saying that the engagement length 37 needs to be at least equal to the square root of a cross-sectional area bounded by the outer surface 36 of the alignment protrusion 34. Preferably the engagement length 37 is at least 1.5 times the square root of a cross-sectional area bounded by the outer surface 36 of the alignment protrusion 34 or 1.5 times the engagement width 38. For further increases in accuracy, the engagement length 37 is preferably at least 2 times, 2.5 times or even 3 times the square root of a cross-sectional area bounded by the outer surface 36 of the alignment protrusion 34 (or 2, 2.5 or even 3 times the engagement width 38).

In order to limit variation in the measurement of the axial distance between the reference and strain datums if the rotational position of the measuring tool is not fixed or otherwise indexed to a common position, the axial run out of the reference datum and strain datum surfaces is preferably a maximum magnitude determined in proportion to the functional length (or a first portion) 39 of the reference pin 10, which is within the strainable portion of the bolt. The reference pin provides a reference length for the unstrained length of the strainable portion 7 of the bolt 4, more specifically for the length 39 of the strainable portion that lies between the root 12 of the reference pin 10 and the strainable portion datum shoulder 23, e.g. the functional length 39 of the reference pin is the first portion of the reference pin which is the same length as the distance between the root 12 of the reference pin and the strainable portion datum shoulder 23 when the bolt is not under load. The remainder of the reference pin is essentially just providing a rigid extension from the point on the reference pin that is coplanar with the strainable portion datum shoulder 23 to the reference datum 15 on the outer end of the reference pin 10, in much the same manner that the strain datum sleeve 32 provides a rigid extension from the strainable portion datum shoulder to the strain datum surface 16 on the outer end of the strain datum sleeve. Ideally the axial run-out of the reference datum 15 and the strain datum 16 surfaces individually is less than one hundredth (1/100th) of the functional length 39 of the reference pin 10. This corresponds to nominally ten times the desirable maximum axial distance between high points of both datum surfaces and is provided to try to keep the datum surfaces within a desired perpendicularity tolerance limit relative to the reference pin 10 to minimise variation in the measurement by the tool 40 of the relative datum positions when the rotational position of the tool relative to the alignment protrusion is not restricted. Alternatively a rotational location feature (not shown, but such as a key-way on one part and the key on the other part) can be used to fix the rotational location of the measuring tool relative the bolt or the alignment protrusion to ensure that measurements are between consistent points on each datum surface.

Similarly if the reference datum and strain datum are substantially coplanar at a specified load, usually at zero load so the datum surfaces can be ground or otherwise machined to be substantially coplanar, then measuring the axial distance between the reference datum and the strain datum will give their relative displacement which is directly proportional to the load on the bolt between the nuts 2 and 3. To obtain usefully accurate load indications in this case, the tolerance of the substantially coplanar datum surfaces needs to be that the axial distance between the high point (which the measuring tool 40 will contact) on the reference datum 15 and the high point on the strain datum 16 is less than one one-thousandth (1/1000th) of the functional length 39 of the reference pin 10. Preferably, the maximum tolerance on the axial distance between the high point on the reference datum 15 and the high point on the strain datum 16 is less than one two-thousandth (1/2000th) of the functional length 39 of the reference pin 10, and for more accurate load measurements, preferably less than one four-thousandth (1/4000th) of the functional length 39 of the reference pin 10.

Figure 1:
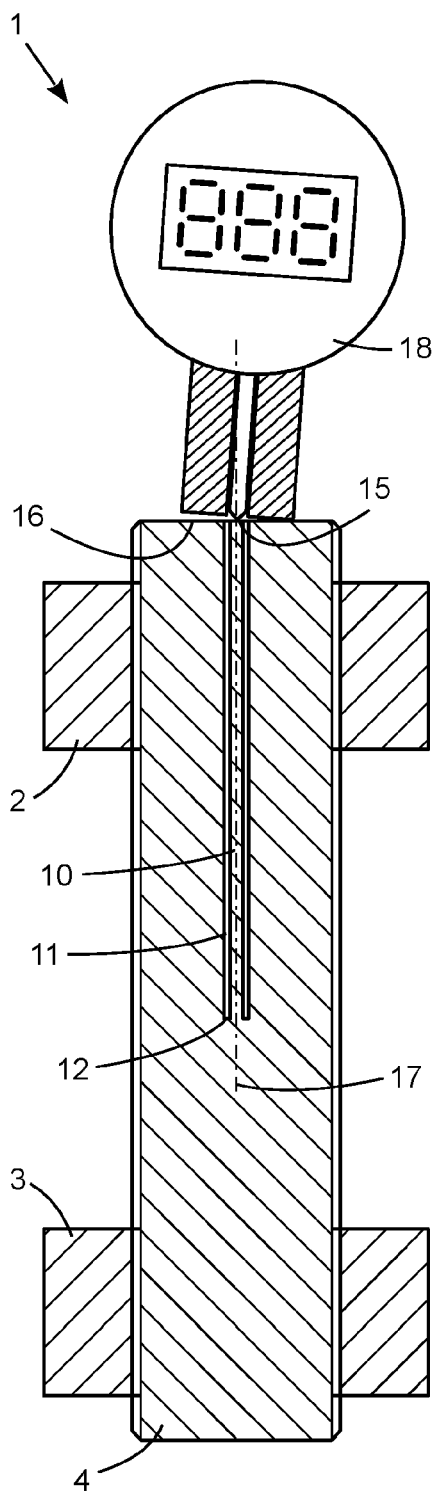
FIG. 1 is a cross-sectional view of a prior art bolt and measuring tool.

To ensure that the angular misalignment between the measuring tool and the bolt is within acceptable limits to prevent the errors illustrated in FIG. 1, the total radial run-out between the engagement surface 36 of the alignment protrusion 34 and the reference pin 10 is ideally less than a predetermined function that includes the outer width or outer diameter 54 of the strain datum contacting surface 51 of the strain datum contacting plate 44, which can be seen in FIG. 5. The predetermined function is preferably the product of the engagement length 37 (e.g. L37) and the functional length 39 (e.g. L39) of the reference pin 10 divided by the product of 500 and the outer diameter 54 (e.g. L54) of the strain datum contact surface of the strain datum contacting plate 44, i.e.:

$$\text{maximum radial run-out} \leq \frac{L37 \times L39}{L54 \times 500}$$

To maintain the desired angular alignment between tool and bolt, it is preferable to ensure that the fit between the engagement bore 42 of the alignment cavity in the main body 41 of the measuring tool 40 and the engagement surface 36 of the alignment protrusion 34 is at loosest a running fit, such as an American National Standards Institute (ANSI) class RC6 fit, which calls for an H9 tolerance on the engagement bore and an e8 tolerance on the alignment protrusion engagement width. To provide increased accuracy and reliability of measurement results, the engagement bore tolerance can be tightened for example from an International Organisation for Standardisation (ISO) loose running fit to a free running fit, easy running fit, sliding fit or even a close clearance fit. While these fits are generally specified as pairs of two-point tolerances, i.e. they do not specify linearity (or conversely waviness) of the engagement bore 42 of the alignment cavity 43 or the engagement width 38 of the alignment protrusion 34, the use of an envelope requirement specifier on each tolerance can ensure that the fit between the alignment protrusion and the measuring tool is sufficient linear. For example the tolerance on the alignment cavity could be specified as H9Ⓔ, which specifies the envelope requirement according to ISO 8015 on a hole of ISO tolerance H9, i.e. the use of the envelope requirement specifier or symbol Ⓔ requires the bore of the cavity to be within the H9 tolerance window along its length, which adds a linearity requirement not specifically present in a hole with a basic H9 tolerance only.

The measuring tool 40 is shown in more detail in FIG. 5, where the sensing elements can be seen more clearly. Also the alignment cavity 43 is clear to see with the alignment protrusion of the bolt not present. The width or diameter of the alignment cavity 43 is formed by the engagement bore 42. When the measuring tool is not on the bolt, the ball 45 does not deflect the diaphragm 46. However, in use, the ball 45 contacts the reference datum on the fastener or bolt and contacts and deflects the diaphragm, with maximum deflection of the diaphragm when the bolt is at zero load. In use the strain datum contacting surface 53 on the strain datum contacting plate 44 is loaded into contact with the strain datum on the bolt (16 in FIGS. 3 and 4) by the coil spring 48. The strain datum contacting plate 44 is fixed to (in this example screwed into) the carrier 47, holding the diaphragm 46 in place. The carrier 47 is spring loaded by coil spring 48 to ensure that, in use, the contact between the strain datum contacting plate 44 and the strain datum on the fastener or bolt is positive but not too forceful which could otherwise distort the measurement. The fit of the carrier 47 within the main body 41 of the measuring tool 40 needs to be sufficiently tightly toleranced to limit misalignment between the carrier 47 carrying the datum contacting elements 44 and 45, so a close sliding fit for example. Strain gauge 49 measures the strain of the diaphragm which relates to the deflection of the diaphragm 46 and ball 45, the strain gauge being connected to a load monitoring system and/or force display device (as shown in FIG. 3) by signal wires 50.

The limited length of the carrier 47 in FIG. 5 requires a tightly toleranced fit between the carrier 47 and the main body 41 of the measuring tool 40. In order to allow a looser sliding fit between the carrier 47 and the main body 41, it would be beneficial to increase the length of the carrier. This would increase the length of the measuring tool of FIG. 5. However, FIG. 6 shows an alternative measuring tool 40 having the same strain datum contacting plate 44. In this measuring tool the carrier had been split into an alignment sleeve portion 55 and a spring location portion 56. The engagement bore 42 of the alignment tool 40 is now formed by the alignment sleeve portion of the carrier and has a primary axis 57. This arrangement reduces tolerance stack up between the bolt datum surfaces and the tool measurement surfaces by reducing the tolerances contributing to any misalignment between the primary axis 57 of the engagement bore 42 of the measuring tool and the primary axis 17 of the reference pin 10 of the bolt in FIGS. 3 and 4, and permits the length of the measuring tool 40 to be reduced. The coil spring can be replaced with a shorter spring such as a wave spring, or the spring can be relocated around the outside of the strain datum contacting plate to further reduce the length of the measuring tool 40.

Figures 7, 8:
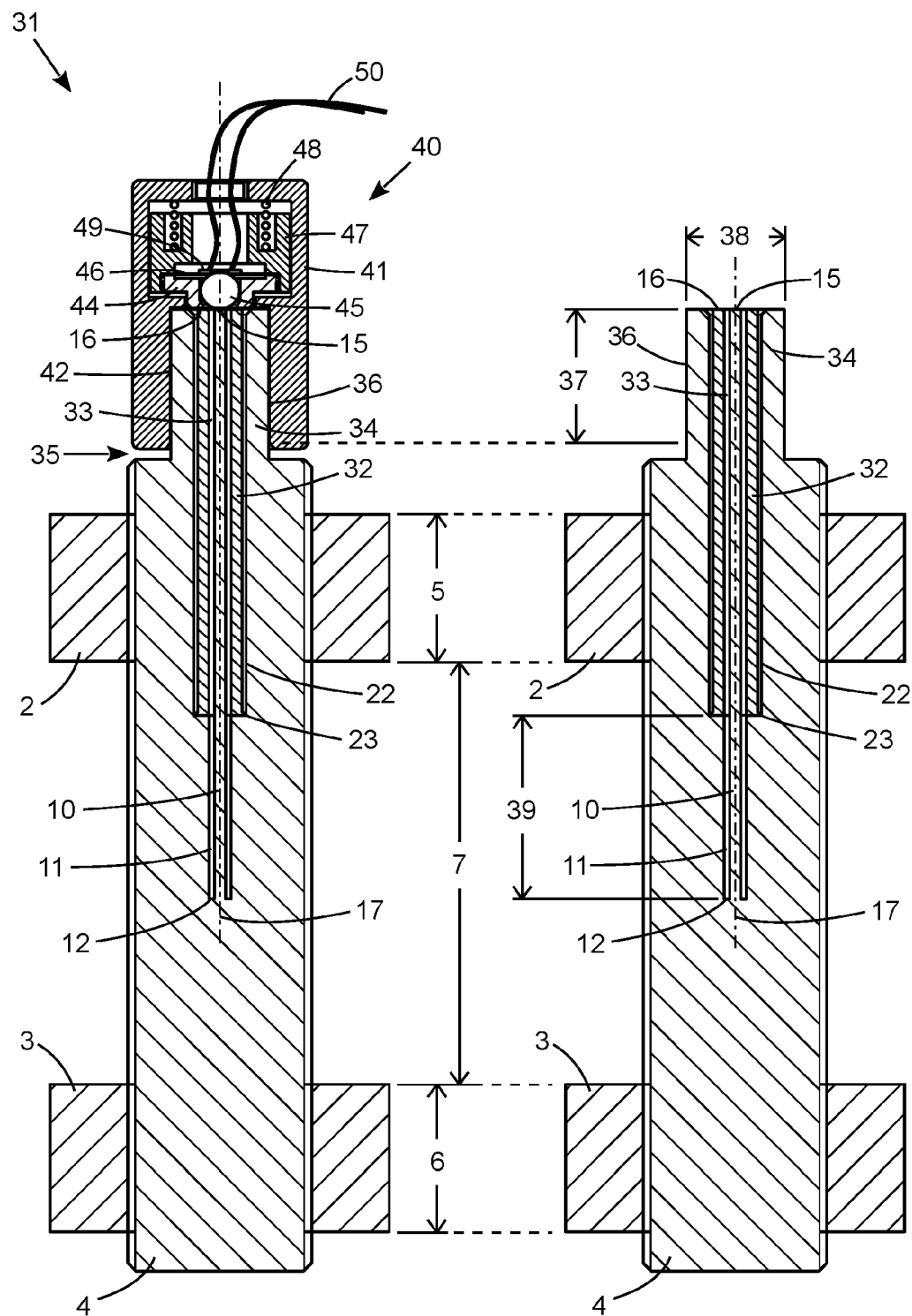
FIG. 7 is a cross-sectional view of the measuring tool of FIG. 5 and an alternative bolt according to embodiments of the present invention.
FIG. 8 is a cross-sectional view of the bolt of FIG. 7.

FIG. 7 shows the same measuring tool 40 on an alternative configuration of fastener or bolt 4. The contact type bolt load measuring arrangement 31 operates on the same principles as that shown in FIG. 3 apart from that the alignment protrusion 34 in FIG. 7 is now part of the main body of the bolt 4 and not part of the strain datum sleeve 32. So the strain datum 16 is no longer part of the alignment protrusion, but it is still at the outer end of the strain datum sleeve 32 and the strain datum contacting plate 44 of the measuring tool 40 does not contact the alignment protrusion 34, but still contacts the strain datum 16 (at the strain datum contacting surface 53 discussed in the description of FIG. 5). The engagement width 38 and length 37 of the alignment protrusion 34 as shown in FIGS. 7 and 8 require the same fits, tolerances and relationships as discussed for the alignment protrusion of FIGS. 3 and 4. The axial gap 35 between the main body 41 of the measuring tool 40 and the bolt 4 is present to ensure that the tool does not bottom out on the main body of the bolt 4, but on the outer end of the alignment protrusion 34, so the spring loaded carrier 47 can apply the desired load of the strain datum contacting plate 44 onto the strain datum, as discussed in relation to FIG. 5.

In any of the arrangements in FIGS. 3 to 13 the bolt 4 and the measuring tool 40 can include a retaining arrangement, so the correct axial position of the measuring tool on the bolt can be determined by a measuring tool axial locating arrangement (not shown). This measuring tool axial locating arrangement could include a spring clip on one part and a channel on the other part to bias or retain the measuring tool 40 in a fixed axial location relative the bolt 4. Alternatively a threaded section can be provided to allow the tool to be screwed onto the bolt to ensure the tool is axially retained on the bolt. Alternatively the measuring tool axial locating arrangement could include ball bearings that follow slots to provide rotational location and one or more ball bearings can have a detent cup to provide an axial bias once seated to retain the measuring tool on the bolt.

Figures 9, 10:
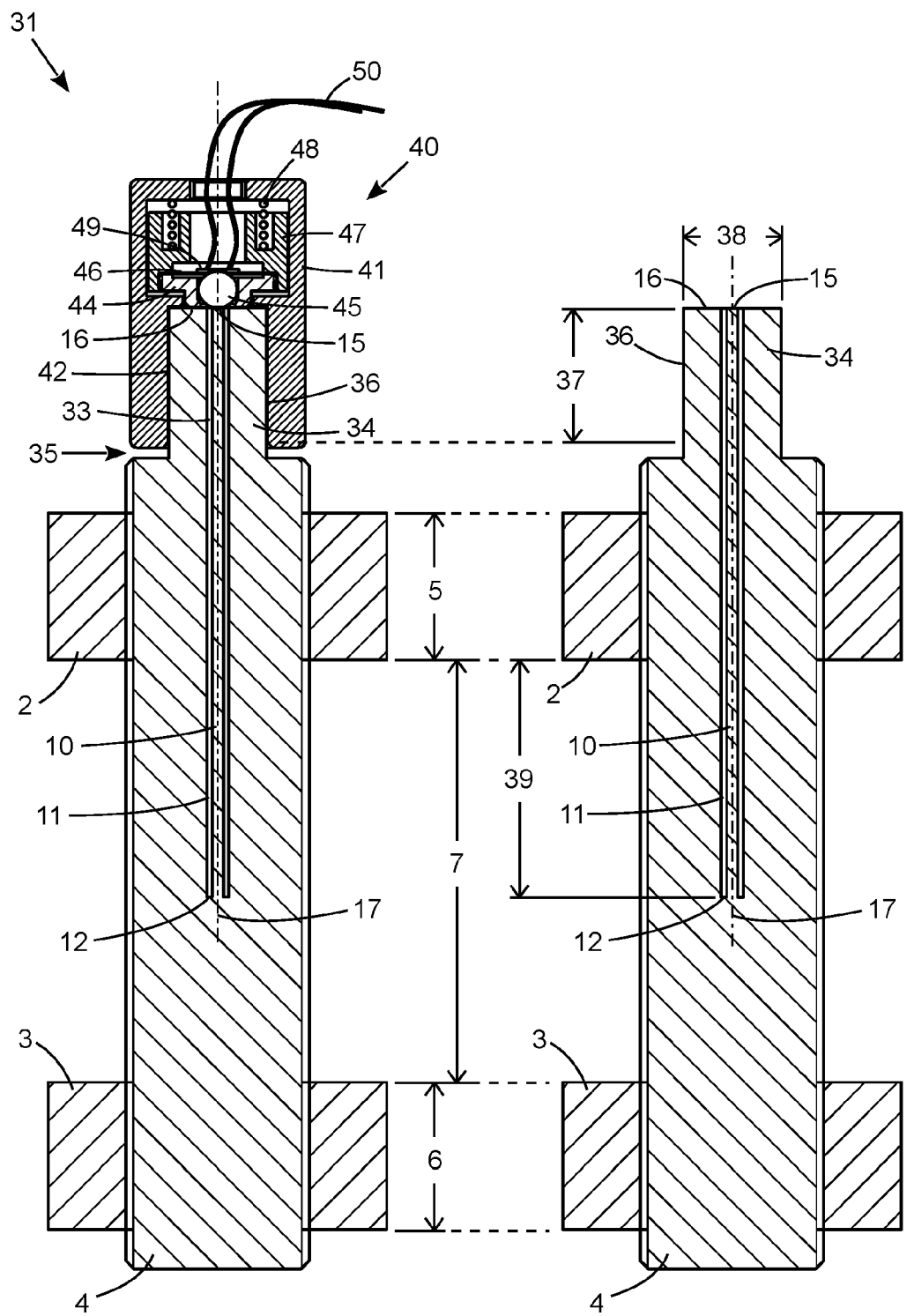
FIG. 9 is a cross-sectional view of the measuring tool of FIG. 5 and an alternative bolt according to embodiments of the present invention.
FIG. 10 is a cross-sectional view of the bolt of FIG. 9.

FIG. 9 shows the same measuring tool 40 from FIG. 5 on a further alternative configuration of fastener or bolt 4. The contact type bolt load measuring arrangement 31 operates on the same principles as that shown in FIGS. 3 and 7. However in this case, the alignment protrusion 34 is now part of the main body of the bolt 4 and includes the strain datum surface 16 and there is no strain datum sleeve. Therefore the functional length 39 of the reference pin 10 is now the axial distance from the root 12 of the reference pin 10 to the boundary between the strainable portion 7 and the first load receiving portion 4. The remainder of the reference pin from the boundary between the strainable portion 7 and the first load receiving portion 4 to the reference datum surface 15 acts to extend the reference pin from the end of the functional length to an easily accessible external surface (the reference datum surface 15). Similarly the functional length of the strainable portion that is effectively being compared to the reference pin functional length is in the same axial region as the functional length 39, from the root 12 of the hole 11 for the reference pin 10 to the boundary between the strainable portion 7 and the first load receiving portion 4. Therefore although the axial position of the nut 2 can vary on the stud bolt 4, which will vary the functional length 39 of the reference pin 10 and the functional length of the strainable portion that is effectively being compared to the reference pin functional length, both vary in the same sense simultaneously. So the error in the strain calculated from the relative displacement of the reference datum 15 and strain datum 16 while greater than the error in the configurations of FIGS. 3 and 7, can still be acceptable in some applications and is still less and gives more repeatable measurements than most prior fastener load measurement arrangements, other than that disclosed in the applicant's prior international patent application publication.

The engagement width 38 and length 37 of the alignment protrusion 34 shown in FIGS. 9 and 10 once again require the same fits, tolerances and relationships as discussed for the alignment protrusion of FIGS. 3 and 4.

The bolt from FIG. 9, shown in FIG. 10 is simpler to manufacture than the bolts in FIGS. 2, 3, 4, 6 and 7, not requiring a strain datum sleeve to be made or a bore formed in the bolt to receive it. The hole 11 can be drilled and the reference pin 10 then welded or otherwise fixed to the root 12 of the hole 11, or the annular hole 11 can be cut by spark erosion for example for form the reference pin from the bolt material. For example, grinding the end of the alignment protrusion allows a very accurate finish for the surface that will become the strain and reference datums, then the reference pin 10 can be formed by spark eroding the annular hole 11. This means that the reference and strain datums are machined together to minimise the relative errors in axial run-out for example.

Figure 11:
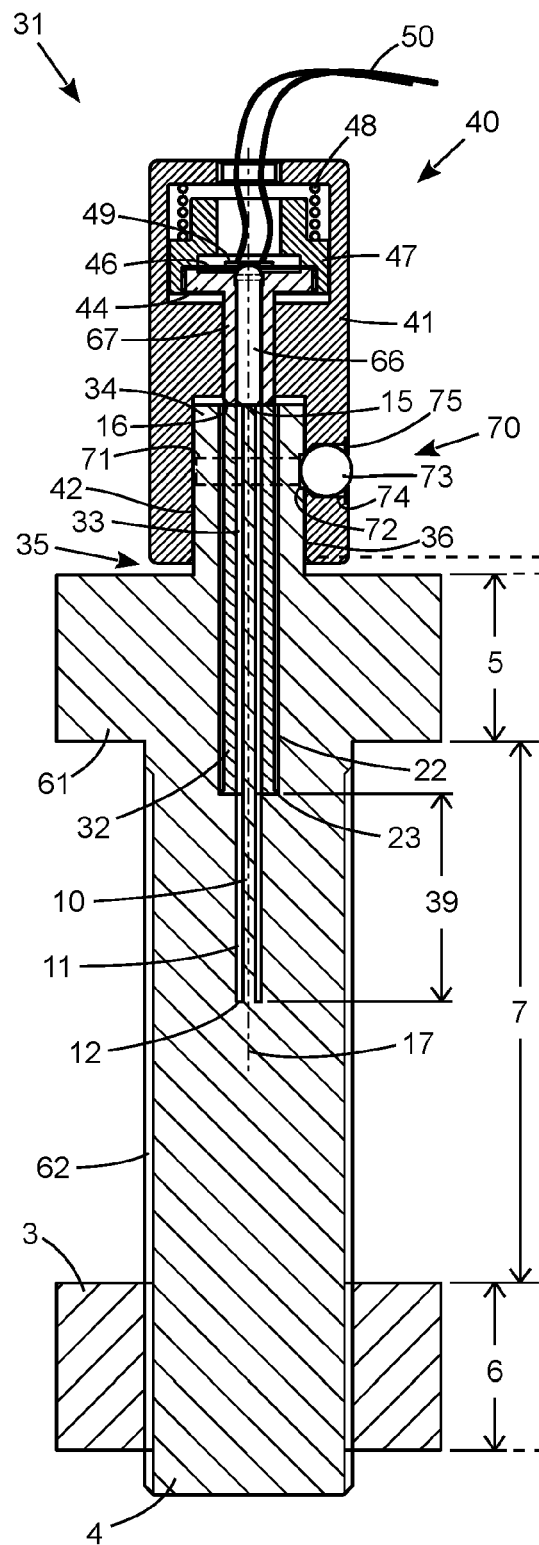
FIG. 11 is a cross-sectional view of a bolt and a measuring tool embodying forms of the present invention.
Figure 12:
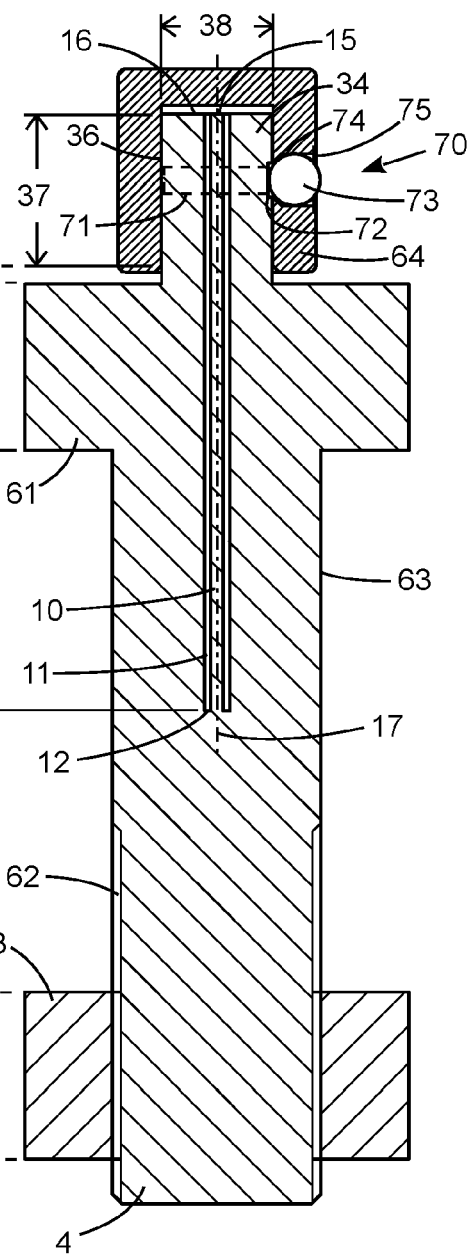
FIG. 12 is a cross-sectional view of a bolt according to a further embodiment of the present invention.

FIG. 11 shows an alternative measuring tool 40 and a further alternative bolt 4 which is a hex headed bolt rather than a stud bolt. So the first load receiving portion 5 of the bolt 4 is now within the bolt head 61. The configuration of the reference pin 10, strain datum sleeve 32 and alignment protrusion 34 is the same as in FIGS. 7 and 8. In FIG. 11 the thread 62 on the bolt continues through most of the strainable portion 7 and around the functional length or first portion of the reference pin 10. However this is not necessary as the nut 3 is not intended to screwed through most of the strainable portion 7. So the bolt can have a longer unthreaded shank 63 as shown in FIG. 12.

The bolt 4 and measuring tool 40 in FIG. 11 also includes a retaining arrangement 70 for providing axial and/or rotational location of the measuring tool 40 relative to the alignment protrusion 34 on the bolt. The retaining arrangement shown is of the detent ball type, the ball 73 being in a radial hole 74 in the measuring tool 40 and being resiliently biased inwards by a spring clip in a groove 75. As the measuring tool 40 is inserted over the alignment protrusion 34 the detent ball 73 enters groove or channel 71 formed in the alignment protrusion and this provides an axial location function. The groove or channel 71 effectively forms the retaining portion of a measuring tool axial locating arrangement. Then the measuring tool can be rotated until the ball engages with the detent cup 72 in the alignment protrusion, providing rotational and axial location. The protective cap 64 in FIG. 12 also includes the sprung detent ball 73 to engage with the groove or channel 71 to provide axial location of the cap.

The bolt in FIG. 12 is again a hex-headed bolt although any form of head that can be gripped could be used, such as a square head. The configuration of the reference pin 10 and alignment protrusion 34 without the inclusion of a strain datum sleeve is the same as in FIGS. 9 and 10. The protective cap 64 shown covering the alignment protrusion is preferably provided to help protect the engagement surface 36, reference datum 15 and strain datum 16 from corrosion or other damage and to prevent ingress of debris into the annular hole 11.

Figure 13:
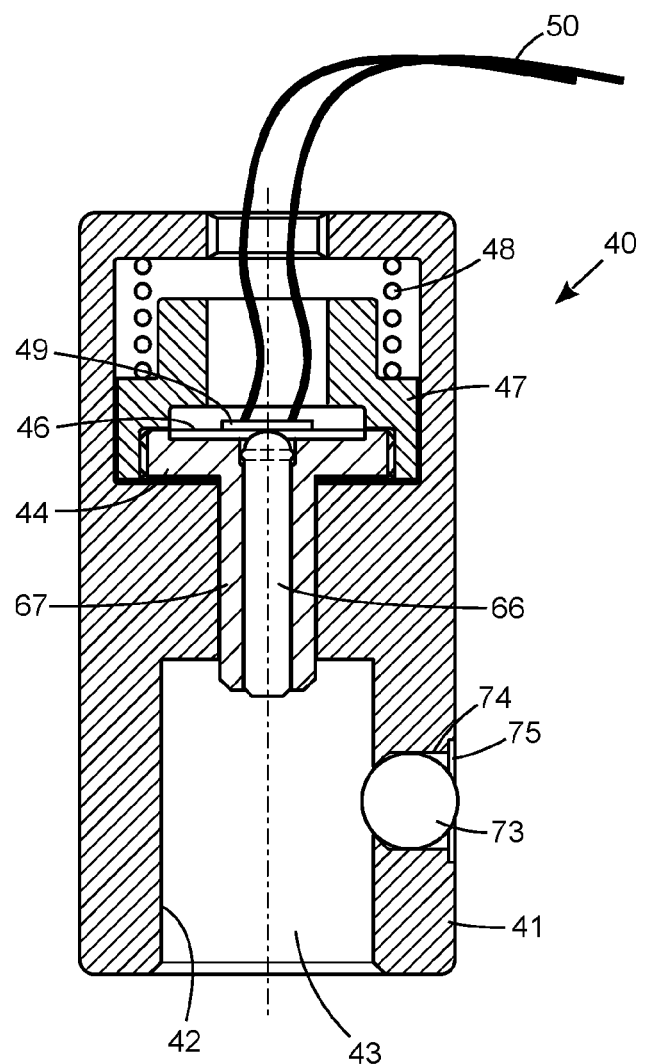
FIG. 13 is a cross-sectional view of the measuring tool of FIG. 11.

The measuring tool 41 of FIG. 11 is shown in more detail in FIG. 13 and is similar to that of FIG. 5, but with the ball 45 (that is provided to contact the reference datum on the bolt and the diaphragm 46) being replaced by a pin 66. Similarly the strain datum contacting plate 44 has an axially extending tubular portion or sleeve 67 around the pin 66. The alignment cavity 43, forming the engagement bore 42, is provided to ensure the alignment of the tool 40 is within the desired tolerances as discussed above. The remainder of the components such as the diaphragm 46, carrier 47, spring 48 and strain gauge 49 operate in the same manner as discussed above. As in FIG. 5, when the measuring tool 40 is not engaged with a bolt, the spring 48 urges the carrier 47 to axially contact the main body 41 of the tool. The pin 66 does not deflect the diaphragm, or at least not as much as when the measuring tool is in use. Any misalignment of the sleeve 67 and pin 66 to the engagement bore 42 adds to any misalignment between the outer surface 36 of the alignment protrusion 34, the engagement bore 42 of the measuring tool 40 and the primary axis of the reference pin (17 in FIGS. 11 and 12). Therefore the fit of the sleeve 67 within the main body 41 of the measuring tool and the length over which the sleeve 67 engages with the main body 41 affect the overall tolerance band between the reference and strain datum surfaces 15 and 16 and the measuring tool surfaces that contact those datums, e.g. the surface of ball 45 and the strain datum contacting surface on plate 44.

Figure 2:
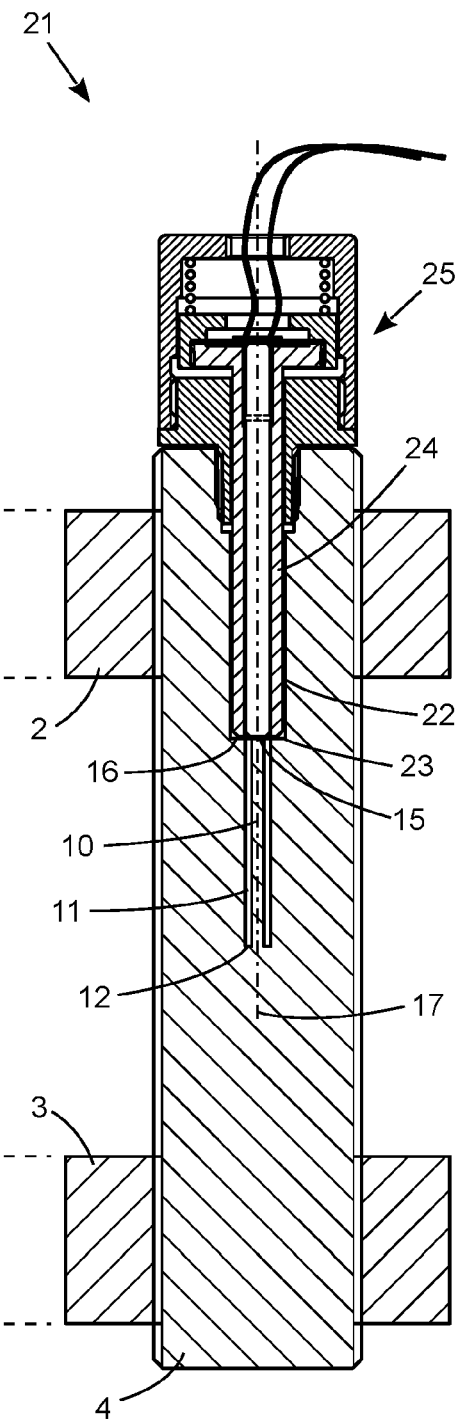
FIG. 2 is a cross-sectional view of a prior art bolt and measuring tool incorporating alignment therebetween.

The strain datum sleeve of FIGS. 3, 4, 7, 8 and 11 effectively extends the strain datum surface of FIG. 2 from inside the strainable portion to the outer end of the bolt, which while not being as accurate as the prior art arrangement in FIG. 2 is still preferable to the inclusion of the first load receiving portion 5 of the bolt 4 between the strainable portion and the strain datum 16 as in FIG. 1 and FIGS. 9, 10 and 12 for achieving accurate load measurements. However the alignment protrusion feature in FIGS. 9 to 12 still make them preferable to FIG. 1 for achieving reliable load measurements. The alignment protrusion feature in FIGS. 3, 4 and 7 to 12 provide both radial and angular alignment between the measuring tool 40 and the reference datum surface 15 and strain datum surface 16 on the bolt. The radial alignment helps to ensure concentricity of measuring surface and tool. The angular alignment helps to ensure that the measuring tool is perpendicular to the measuring surfaces. The angular alignment, coupled with tight run-out tolerancing of the measuring and datum surfaces greatly improves the repeatability of measurement. This in turn improves the repeatability of the measurement results, i.e. the accuracy of the bolt load measurements. The tight run-out tolerancing, helping to ensure that the reference datum surface 15 and the strain datum surface 16 are substantially coplanar when the bolt is not loaded can also eliminate the need for initial length measurement of each bolt, keeping records of the initial length measurements for all bolts and referencing the initial length measurement for a specific bolt when taking a strain measurement and calculating the load on the bolt.

The invention claimed is:

1. A fastener comprising:
a first load receiving portion and a second load receiving portion;
a strainable portion between the first and second load receiving portions;
a measuring end including an alignment protrusion;
a cavity extending from the measuring end of the fastener, the cavity including a reference pin root shoulder located within the strainable portion of the fastener;
a reference pin having a root end and a reference end, the root end of the reference pin being fixed to the reference pin root shoulder in the cavity and the reference end of the reference pin including a reference datum; and either
a) a strain datum on an outer end of the alignment protrusion, or
b) a strain datum sleeve having a strainable portion datum shoulder contacting end and a strain datum end, the strainable portion datum shoulder contacting end for contacting a strainable portion datum shoulder included in the cavity and located within the strainable portion of the fastener, the strain datum end including a strain datum, wherein the alignment protrusion has an engagement portion having an engagement width perpendicular to an engagement portion axial length, the engagement portion axial length being at least 0.9 times the engagement width or at least equal to the square root of a cross-sectional area for non-circular outer profiles, and the engagement width of the alignment protrusion has a tolerance of no wider than ISO c11.

2. The fastener of claim 1, wherein when the strain datum is on the outer end of the alignment protrusion, the alignment protrusion is integral with the measuring end of the fastener.

3. The fastener of claim 1, wherein when the strain datum is on the outer end of the alignment protrusion, the cavity comprises the strainable portion datum shoulder located within the strainable portion of the fastener, the fastener further comprising:

a strain datum sleeve having a strainable portion datum shoulder contacting end and a strain datum end, the strain datum end including the alignment protrusion and the strain datum.

4. The fastener of claim 1, wherein the alignment protrusion includes an outer engagement surface to engage a measuring tool.

5. The fastener of claim 1, wherein the reference pin includes a first portion between the root end of the reference pin and a boundary between the strainable portion and the load receiving portion towards the measuring end of the fastener, the reference pin including a second portion between the first portion and the reference end of the reference pin.

6. The fastener of claim 5, wherein when the fastener is not loaded, an axial distance from the highest point of the reference datum to the highest point of the strain datum is less than 1/1000th of an axial length of the first portion of the reference pin.

7. The fastener of claim 1, wherein the alignment protrusion is configured to engage a measuring tool at least at two locations spaced apart by an axial spacing length that is at least equal to the square root of a transverse cross-sectional area enclosed by an outer profile at said at least two locations.

8. The fastener of claim 1, wherein the engagement portion axial length of the alignment protrusion is at least 1.5 times the engagement width, and the alignment protrusion is configured to engage a measuring tool at least at two locations spaced apart by an axial spacing length that is at least 1.5 times the square root of a cross-sectional area enclosed by an outer profile at said at least two locations.

9. The fastener of claim 1, wherein the engagement portion axial length of the alignment protrusion is at least 2 times the engagement width, and the alignment protrusion is configured to engage a measuring tool at least at two locations spaced apart by an axial spacing length that is at least 2 times the square root of a transverse cross-sectional area enclosed by an outer profile at said at least two locations.

10. The fastener of claim 1, wherein the engagement width of the alignment protrusion has a tolerance of no wider than ISO d9.

11. The fastener of claim 10, wherein the engagement width of the alignment protrusion has a tolerance of no wider than ISO h6.

12. The fastener of claim 1, wherein the fastener includes a retaining portion for retaining a tool or protective cap on the alignment protrusion.

13. A system including the fastener of claim 1 and a measuring tool, the measuring tool including an alignment cavity for receiving the alignment protrusion, a fit between the alignment cavity and the alignment protrusion being at loosest a running fit.

14. The system of claim 13, wherein the alignment cavity is engaged around the alignment protrusion, the tool being configured to produce a signal or read-out value, the fit between the alignment cavity and the alignment protrusion ensuring that the tool is substantially aligned with the fastener to reduce or substantially eliminate variations in the signal or read out value.

15. The system of claim 13 wherein the fastener and the tool include features co-operable to limit rotation of the tool relative to the fastener.

16. The system of claim 13, wherein a two point tolerance range on the engagement width of the alignment protrusion engaging portion of the fastener and on a width of the alignment cavity of the tool each has an envelope requirement specifier such that angularity, linearity and concentricity variations do not exceed an envelope defined by a two point tolerance range corresponding to the fit between the alignment cavity and the alignment protrusion.

17. A method of checking the load on the fastener of claim 13, the measuring tool being configured to produce a signal or read-out corresponding to said load, the method including engaging the tool onto the fastener such that the alignment cavity is engaged over the alignment protrusion by an engagement length, the fit and the engagement length together ensuring that the tool and the alignment protrusion are substantially aligned to reduce or substantially eliminate variations in the signal or readout value associated with rotating the tool.

18. A tool for checking the load on the fastener of claim 1, the tool comprising:

an alignment cavity to engage the alignment protrusion to align the tool, the alignment cavity having an engagement width and an engagement length; and a strain datum contacting portion for contacting the strain datum and a reference datum contacting portion for contacting the reference datum, the alignment cavity having a bore tolerance of no wider than ISO H9 to align the tool, and the engagement length of the alignment cavity being at least 0.9 times the engagement width or at least equal to the square root of a cross-sectional area of the alignment cavity for non-circular outer profiles.

19. The tool of claim 17, further including a deformable portion and a strain gauge, the strain datum contacting portion and the reference datum contacting portion respectively extending away from the deformable portion and being moveable relative to each other to simultaneously engage the respective strain datum or reference datum, the deformable portion being arranged to be deformed by the relative movement, and the strain gauge being arrangement to provide an indication of the deformation.

20. The tool of claim 17 further including:

a retaining portion for retaining the tool on the fastener; and a bias for biasing, relative to the retaining portion, one of the datum contacting portions.

\* \* \* \* \*